(12) United States Patent
Bennett et al.

(10) Patent No.: US 11,033,994 B2
(45) Date of Patent: Jun. 15, 2021

(54) SAFETY COVER FOR DRILLING DEBRIS EXTRACTION AND TOOL SUPPORT AND A METHOD FOR OPERATING THE SAME

(71) Applicant: The Boeing Company, Chicago, IL (US)

(72) Inventors: Don B. Bennett, Melbourne (AU); Cameron Edwards, Melbourne (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/194,600

(22) Filed: Nov. 19, 2018

(65) Prior Publication Data

US 2020/0156198 A1    May 21, 2020

(51) Int. Cl.
*B23Q 11/08*  (2006.01)
*B23B 47/00*  (2006.01)
*B23Q 11/00*  (2006.01)

(52) U.S. Cl.
CPC .......... *B23Q 11/0046* (2013.01); *B23B 47/00* (2013.01); *B23Q 11/08* (2013.01); *B23B 2260/058* (2013.01); *B23B 2260/122* (2013.01)

(58) Field of Classification Search
CPC ............ B23Q 11/0071; B23Q 11/0046; B23Q 11/0078; B23B 2251/68; B23B 2270/62; E21B 19/02; E21B 19/04
See application file for complete search history.

(56) References Cited

U.S. PATENT DOCUMENTS

| | | | |
|---|---|---|---|
| 1,942,453 A * | 1/1934 | Ruemelin .......... | B23Q 11/0046 248/75 |
| 2,339,324 A * | 1/1944 | Fischer .............. | B23Q 11/0046 408/56 |
| 3,167,260 A * | 1/1965 | Gibbons ............ | B23Q 11/0046 241/56 |
| 2005/0281627 A1* | 12/2005 | Britz .................... | B23Q 11/127 408/67 |
| 2010/0058911 A1* | 3/2010 | Goddard ................ | B23Q 11/06 83/478 |
| 2012/0051858 A1* | 3/2012 | Everington, Jr. .. | B23Q 11/0046 408/67 |
| 2013/0206440 A1* | 8/2013 | Ikuta .................. | B23Q 11/0071 173/198 |
| 2014/0093320 A1* | 4/2014 | Sullivan .................... | B25F 3/00 408/67 |
| 2014/0234046 A1* | 8/2014 | Okouchi .................... | B25F 5/02 409/137 |

FOREIGN PATENT DOCUMENTS

| | | | | |
|---|---|---|---|---|
| DE | 202016104254 U1 * | 8/2016 | .......... | B23Q 11/126 |
| DE | 102015225375 A1 * | 6/2017 | ................ | B25F 5/00 |

OTHER PUBLICATIONS

DE-102015225375-A1 Machine Translation, pp. 12-21 (Year: 2020).*
DE-202016104254-U1 Machine Translation, pp. 11-19 (Year: 2020).*

* cited by examiner

*Primary Examiner* — Nicole N Ramos
(74) *Attorney, Agent, or Firm* — Felix L. Fischer

(57) ABSTRACT

A safety cover and support assembly has safety cover with a first flange and a second flange depending from a top plate, the first flange and second flange shaped to receive and engage geometrical elements of a drill motor. A vacuum extractor extends from the second flange with an inlet aperture positioned adjacent a drill foot of the drill motor. A support attachment extends from the top plate. A support is engaged in the support attachment.

20 Claims, 16 Drawing Sheets

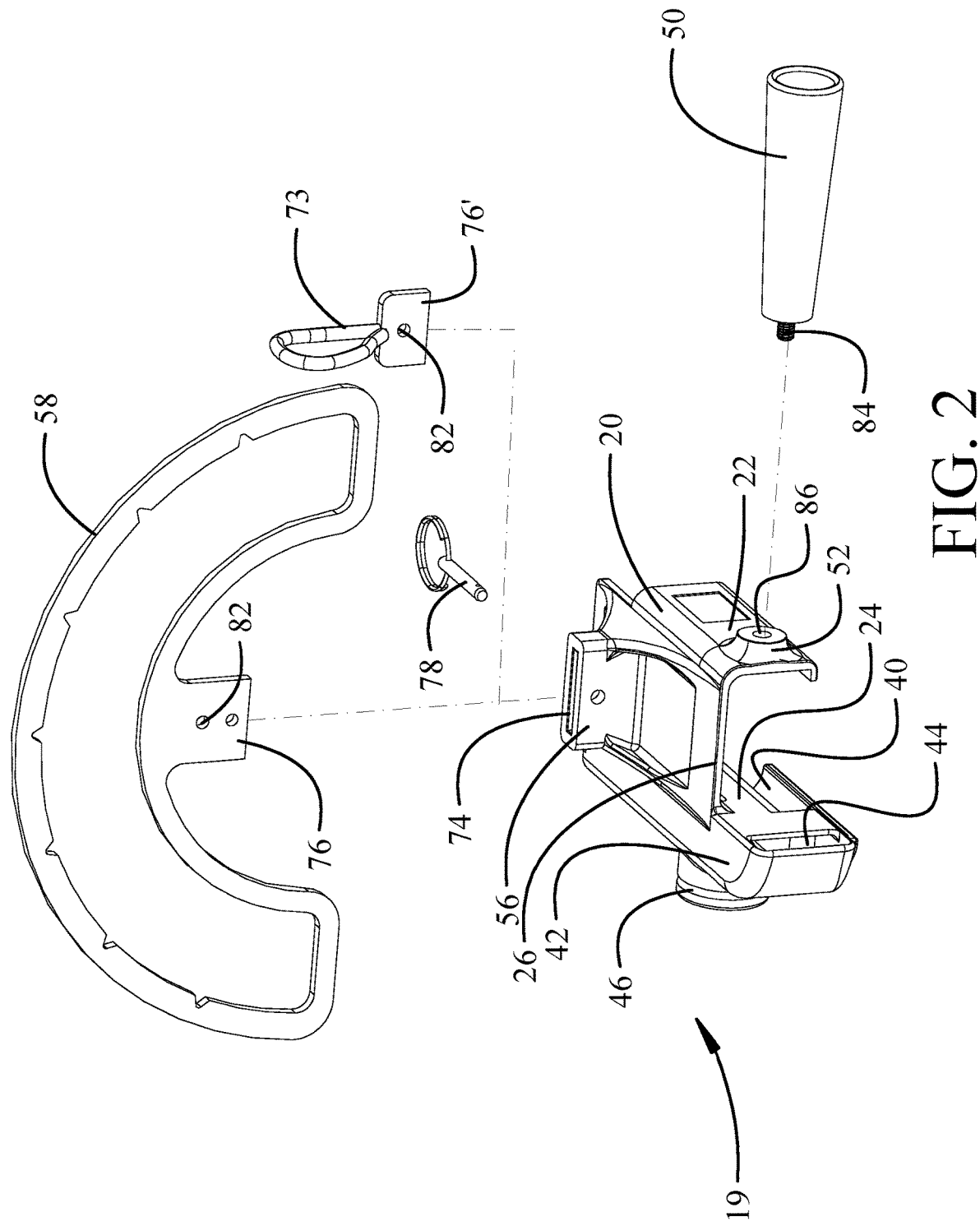

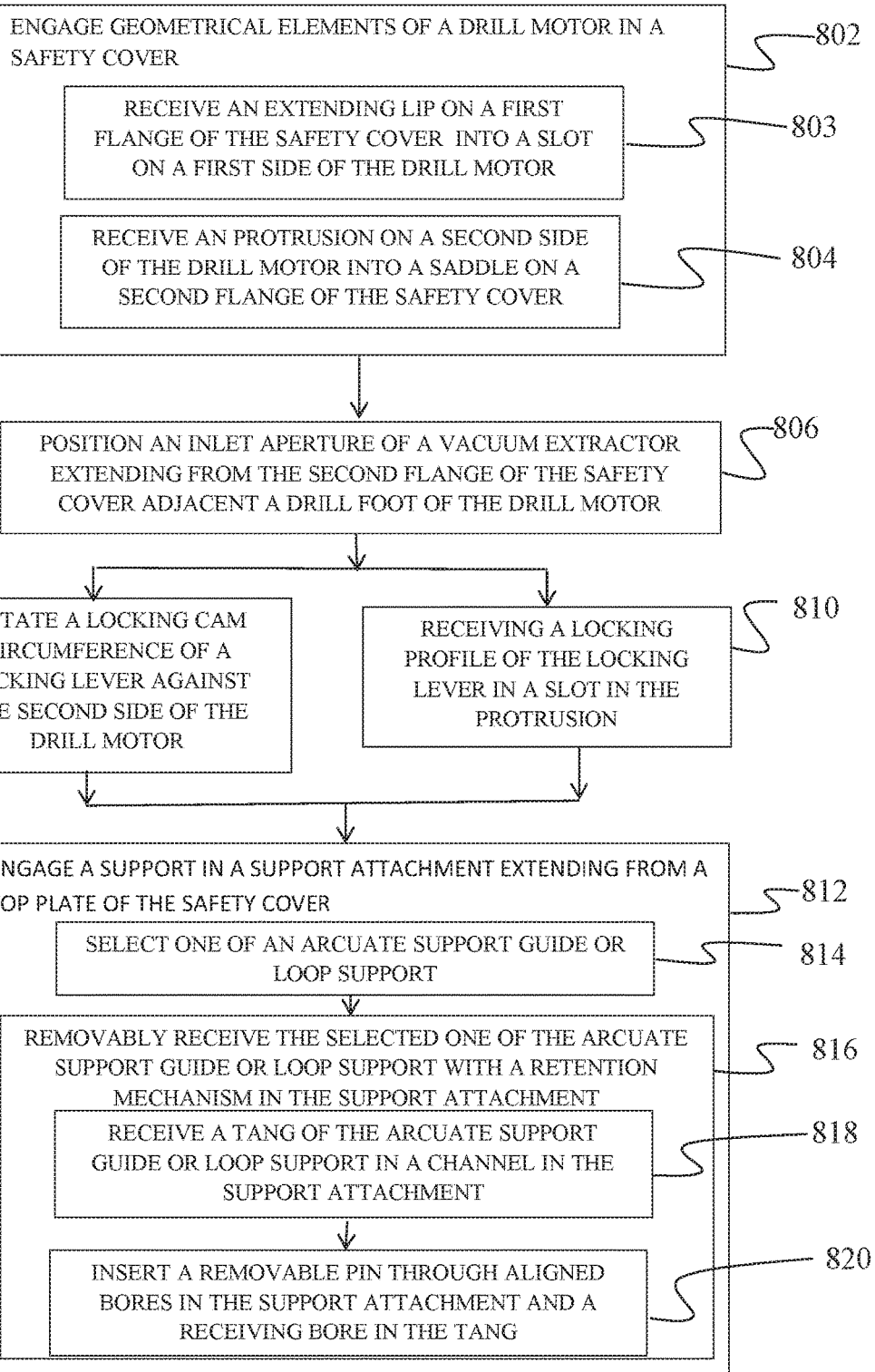

SAFETY COVER FOR DRILLING DEBRIS EXTRACTION AND TOOL SUPPORT AND A METHOD FOR OPERATING THE SAME

BACKGROUND INFORMATION

Field

Implementations shown in the disclosure relate generally to drilling tool systems and more particularly to implementations for a safety cover and support assembly attachable to a tool for vacuum extraction of an exhaust stream during drilling of fiber reinforced plastic structures and supporting the tool during use.

Background

Pneumatic or electrically powered drilling tools are employed by mechanics and assemblers during manufacturing and maintenance operations on carbon fiber reinforced plastic structures. Drilling of carbon fiber reinforced plastics may create exhaust streams of chips, debris and aerosols or vapors which need to be collected and removed from the work environment.

SUMMARY

Exemplary implementations provide a safety cover and support assembly having safety cover with a first flange and a second flange depending from a top plate, the first flange and second flange shaped to receive and engage geometrical elements of a drill motor. A vacuum extractor extends from the second flange with an inlet aperture positioned adjacent a drill foot of the drill motor. A support attachment extends from the top plate. A support is engaged in the support attachment.

The implementations described additionally provide a tool system with a drill motor having a drill foot. A tether is attached to a suspension device and terminates in a clip. A safety cover has a first flange and a second flange depending from a top plate, the first flange and second flange shaped to receive and engage geometrical elements of the drill motor. A vacuum extractor extends from the second flange with an inlet aperture 44 positioned adjacent the drill foot of the drill motor. A support attachment extends from the top plate and engages a support having an arcuate support guide with a plate having an arcuate slot with an arc with respect to an axis through a center of gravity of the drill motor. The clip is engaged in the arcuate slot with the tether providing a reaction force through the suspension device.

The exemplary implementations allow a method for drilling wherein geometrical elements of a drill motor are engaged in a safety cover having a first flange and a second flange depending from a top plate, the first flange and second flange shaped to receive the geometrical elements. An inlet aperture of a vacuum extractor extending from the second flange is positioned adjacent a drill foot of the drill motor. A support is engaged in a support attachment extending from the top plate.

BRIEF DESCRIPTION OF THE DRAWINGS

The features, functions, and advantages that have been discussed can be achieved independently in various implementations or may be combined in yet other implementations further details of which can be seen with reference to the following description and drawings.

FIG. 2 shows an exploded view of the safety cover and support assembly;

DETAILED DESCRIPTION

Figure 1A:
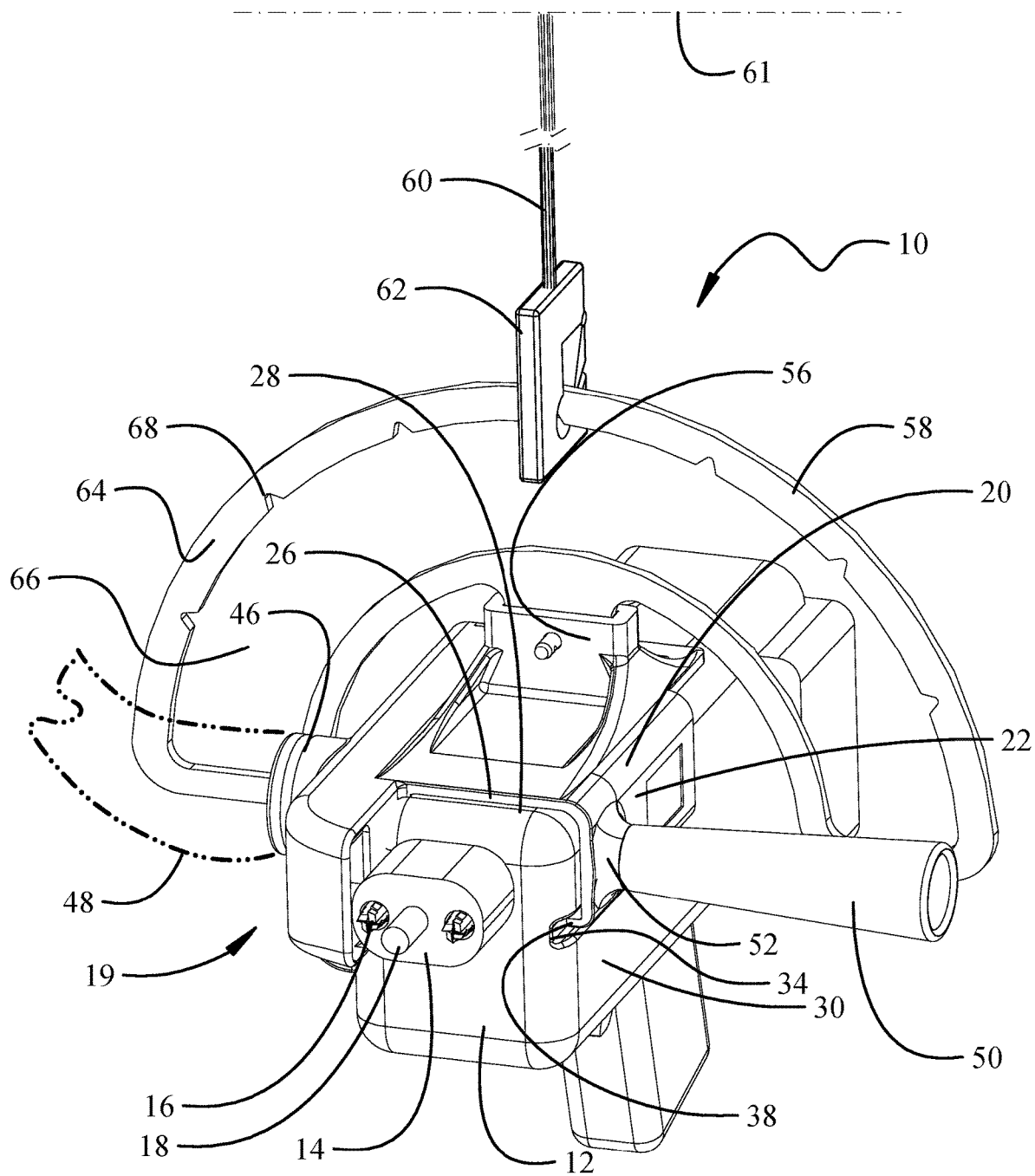
FIGS. 1A-1F show a front left pictorial representation, front right pictorial representation, right side view, left side view, front view, and right rear pictorial representation, respectively, of a first exemplary implementation of a tool system.
Figure 1B:
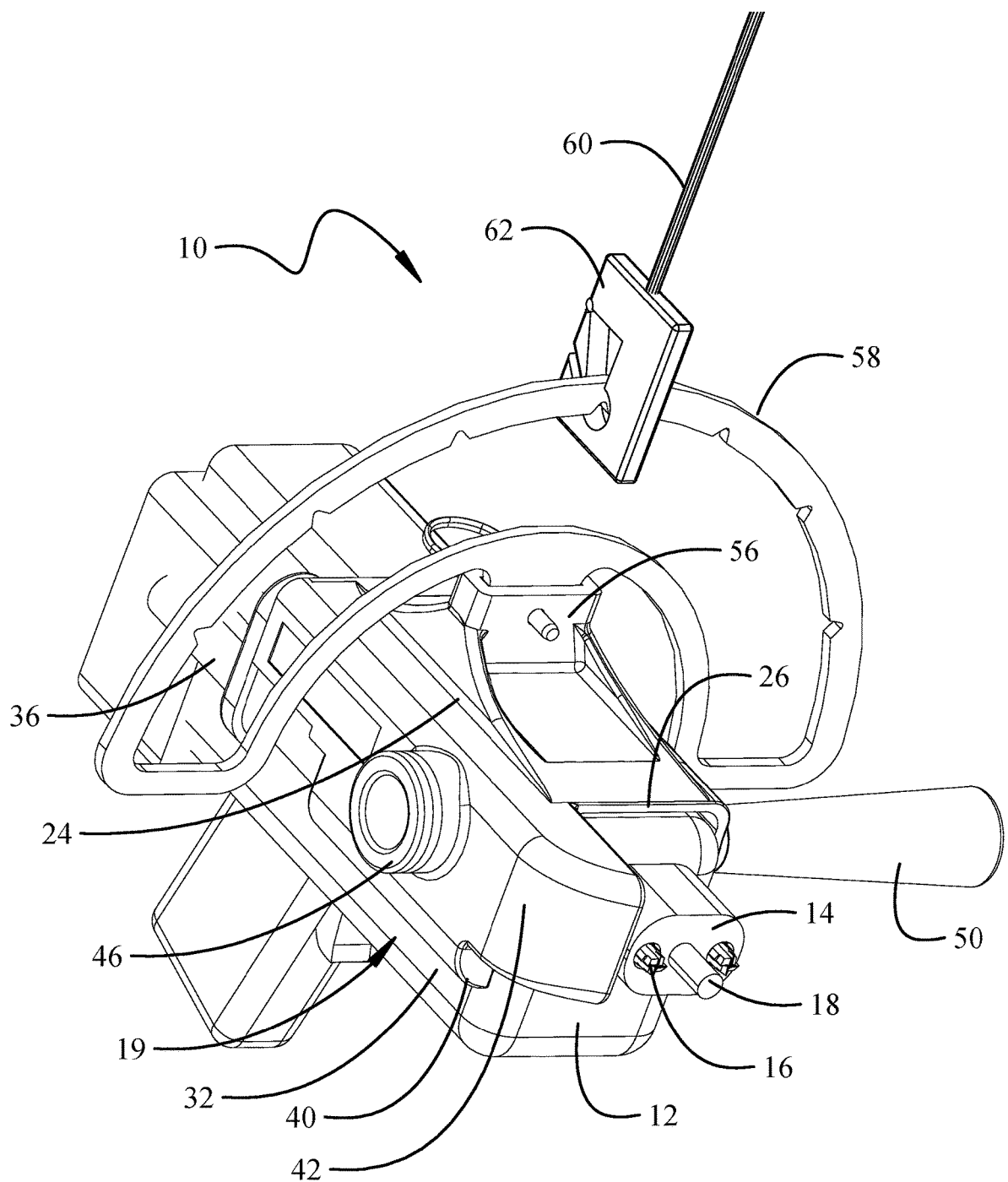
Figure 1C:
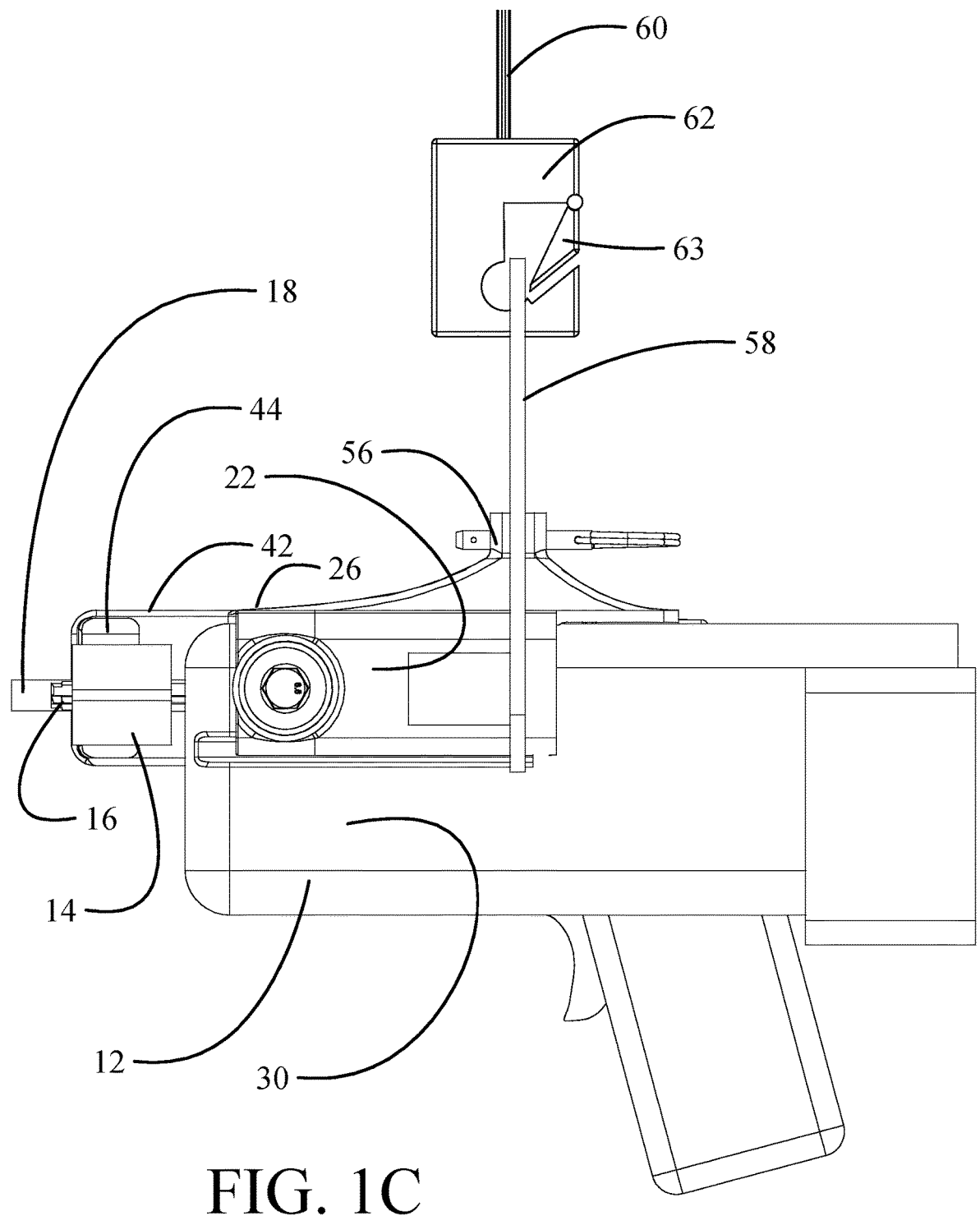
Figure 1D:
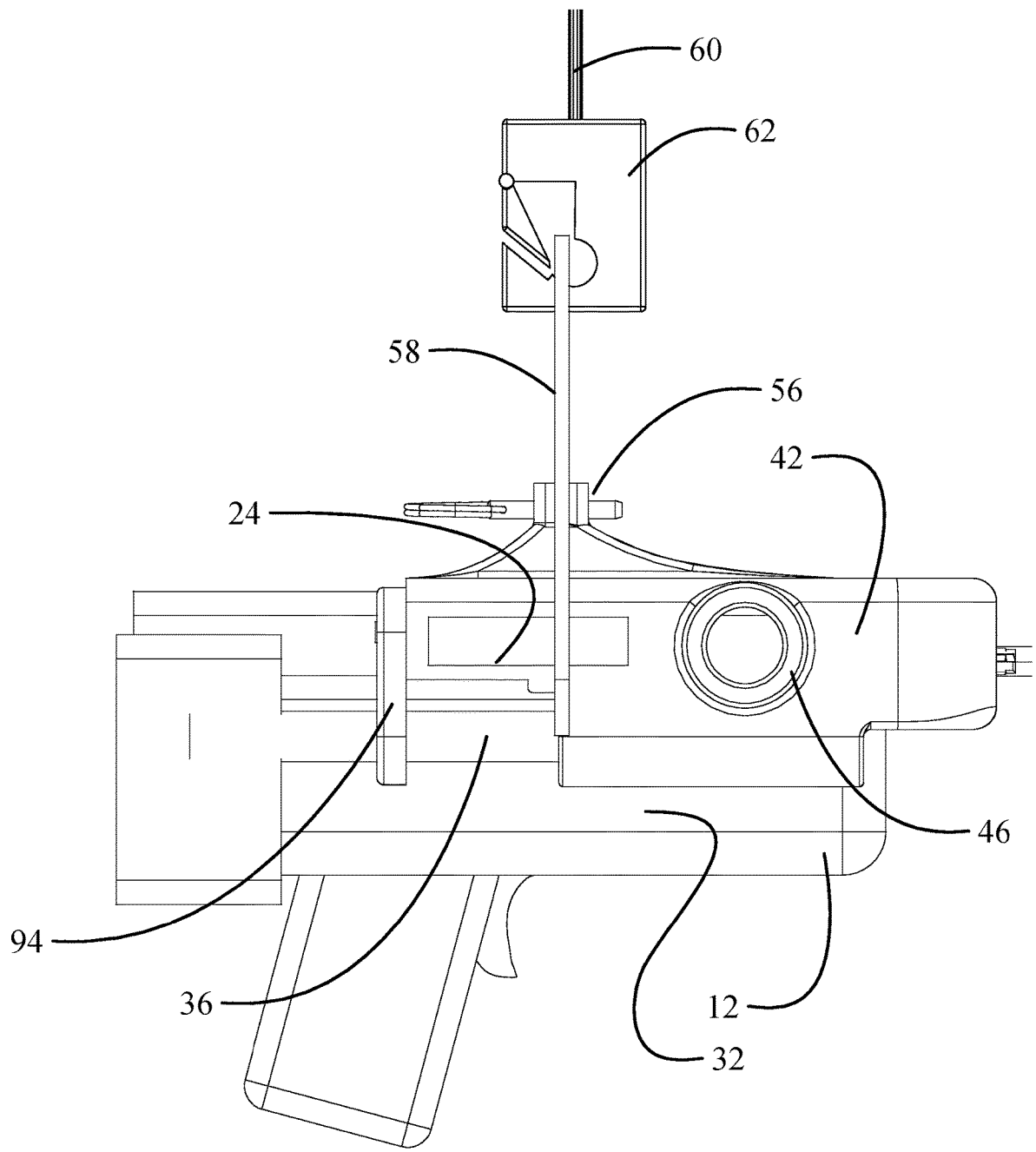
Figure 1E:
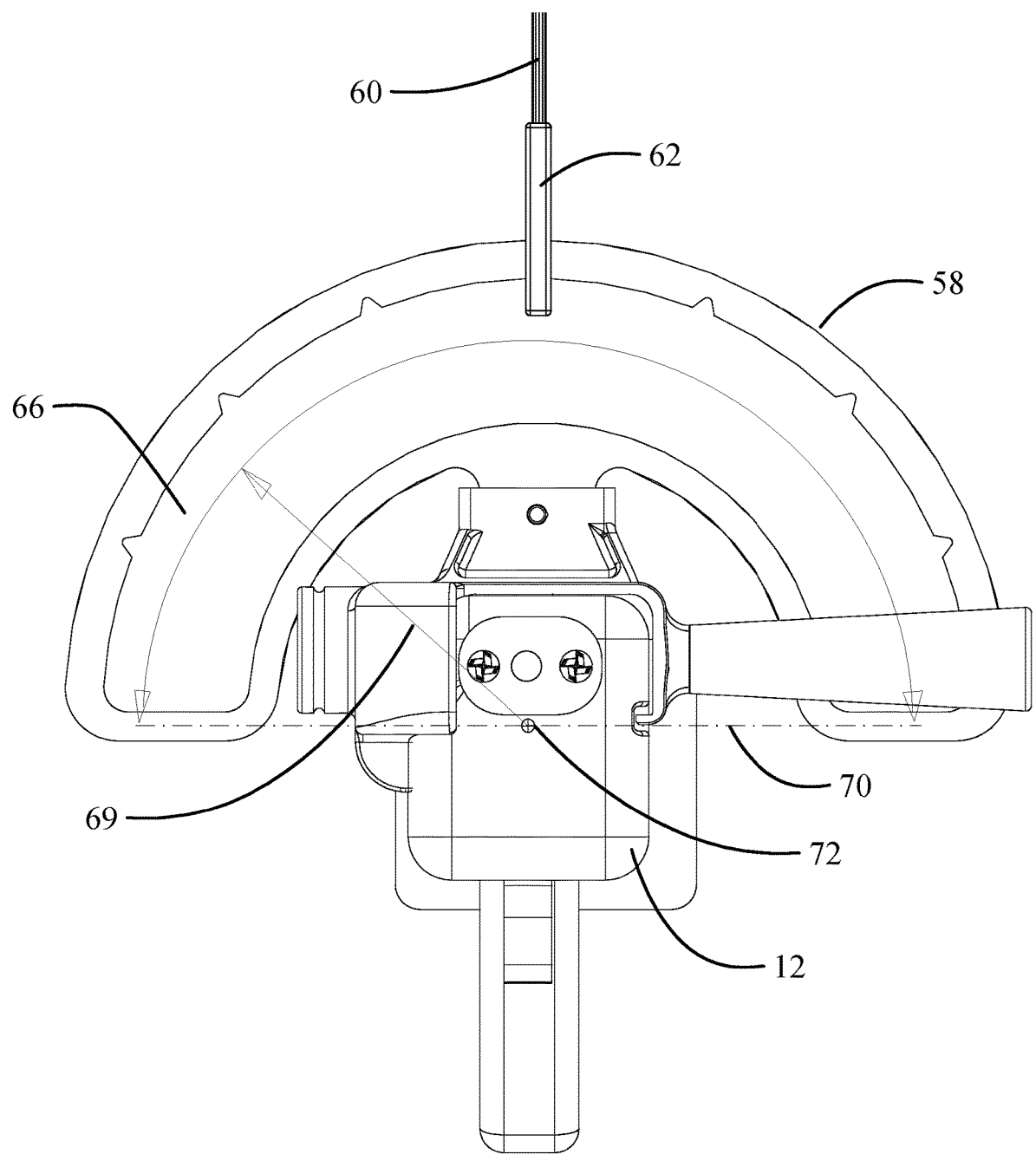
Figure 1F:
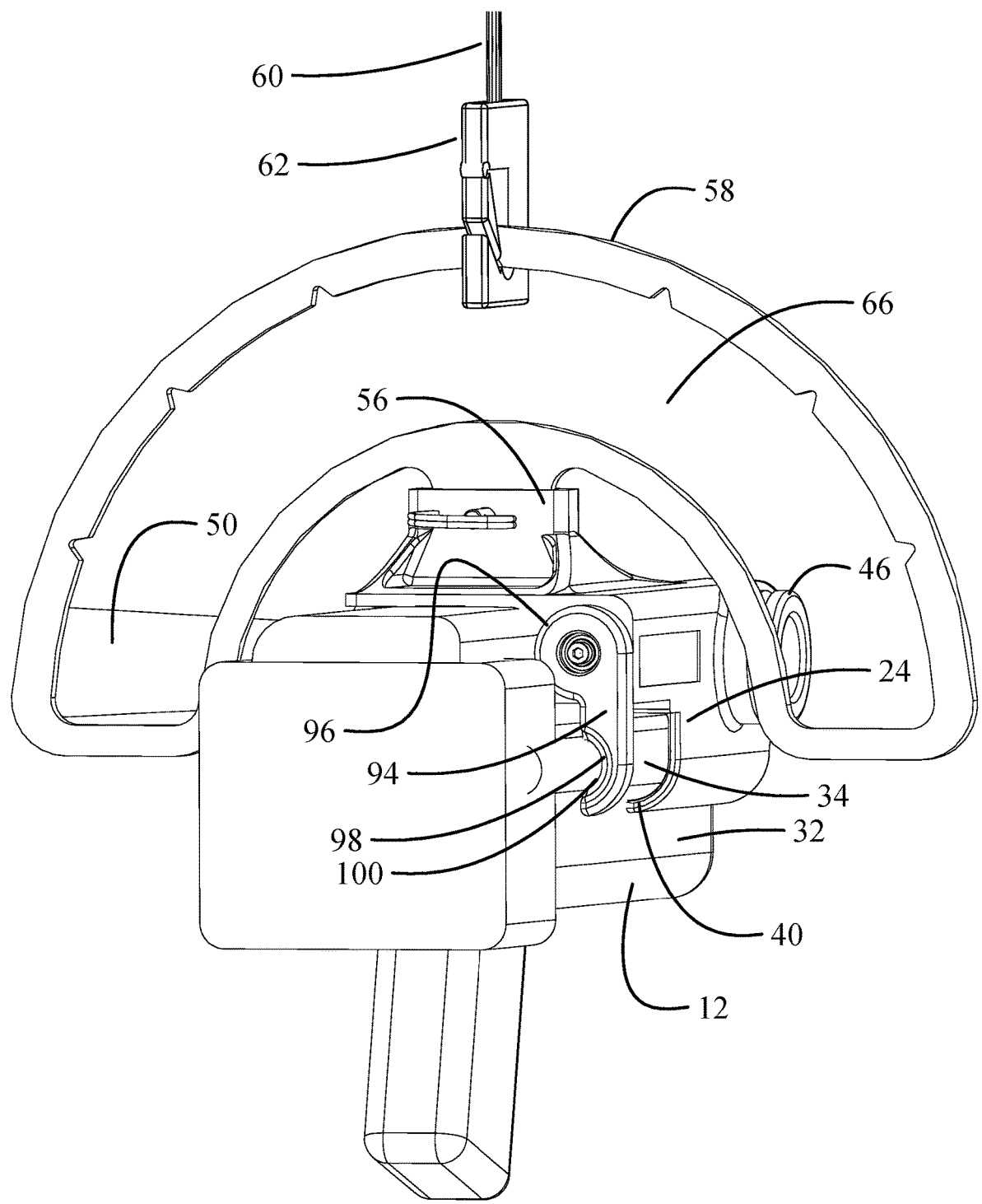

The exemplary implementations described herein provide a safety cover and support assembly for a tool system that allows removable attachment of the safety cover to a tool such as a drill motor with a vacuum extractor in the safety cover positioned adjacent cutting elements of the tool to safely divert an exhaust stream created by operation of the tool. An integrated support guide is attachable to an overhead support through a suspending device to minimize balance positioning forces on the tool.

Referring to the drawings, FIGS. 1A-1E show a tool system 10 which incorporates a drill motor 12 such as a nut plate drill motor typically known in the art as a Spacematic drill. The drill motor 12 has a drill foot 14 that may operatively support one or more drill bits 16 with a centering pin 18. A safety cover and support assembly 19 is removably attached to the drill motor 12.

The safety cover and support assembly 19 (seen in an exploded view in FIG. 2) includes a safety cover 20 (seen in detail in FIGS. 3A-3C) that has a first flange 22 and a second flange 24 depending from a top plate 26. The first flange 22 and second flange 24 are shaped to receive and engage geometrical elements of the drill motor 12. The drill motor 12 is inserted into the safety cover 20 with the top plate 26 engaging a top surface 28 of the drill motor 12 and the first and second flanges 22, 24 engaging first and second sides 30, 32 of the drill motor. In the exemplary implementation, the drill motor 12 has a groove or slot 34 as a geometrical element on the first side 30 and a semi-cylindrical protrusion 36 as a geometrical element on the second side 32 (best seen in FIG. 1E). An extending lip 38 on the first flange 22 is received within the slot 34 and a saddle 40 on the second flange 24 receives the protrusion 36.

A vacuum extractor 42 extends from the second flange 24 with an inlet aperture 44 positioned adjacent the drill foot 14. A vacuum port 46 transversely extends from the vacuum extractor 42 to receive a vacuum hose 48 (shown in phantom in FIG. 1A) connected to a vacuum pumping system (not shown).

A supplemental grip 50 is received on a boss 52 on the first flange 22 to allow two handed operation of the drill motor 12 with an operator grasping the handle 54 of the drill motor with one hand and the supplemental grip 50 with the other hand. The supplemental grip 50 is removable in the exemplary implementation to allow reduced overall width in close quarters operation of the tool system 10.

The safety cover 20 incorporates a support attachment 56 extending from the top plate 26 to engage a support. In a first exemplary implementation as seen in FIGS. 1A-1F, the support is an arcuate support guide 58 that provides an upward reaction force applied by a suspension device over a center of gravity of the drill motor 12 as the drill motor is operated. The suspension device may be a tether, a tool balance arm, or other suspending element providing a single point of attachment. The implementations herein employ a cable or fabric tether 60 but as used herein the term "tether" is defined as any overhead single point support. The tether 60 attaches to the arcuate support guide 58 with a clip 62. In exemplary implementations, the arcuate support guide 58 includes a plate 64 with an arcuate slot 66 cut through the plate. The slot 66 in the plate 64 can include engaging indices 68, such as notches or bumps, to maintain a fixed angle of rotation of the drill motor 12. In exemplary implementations, the notches, indentations, or bumps can be spaced along the inner surface of the arcuate slot 66 at predetermined increments, such as 5° increments. An alternative exemplary implementation of the guide assembly may be an arcuate guide rail and the clip 62 slides along the guide rail as the drill motor 12 is rolled to drill holes that require a rotation of the drill motor to accommodate the necessary orientation. The engaging indices 68 or slight friction between the clip 62 and the slot 66 or guide rail maintains a position/orientation (i.e., angle) of the arcuate support guide 58 with respect to the tether as holes are drilled. Alternatively, a bearing or bushing in the slot 66 or around the guide rail may be employed to reduce friction when the clip slides within the slot or along the guide rail. In the exemplary implementation shown in FIG. 1E, nominally a 180° arc 69 with respect to an axis 70 through a center of gravity 72 of the drill motor 12 is employed. However, if a smaller range of angular motion is desired, the arc 69 may be less than 180° and, if a larger range of angular motion is desired, the arc 69 may be more than 180°.

The tether 60 is suspended from an overhead support 61. Details of the overhead support 61 are not shown, but the overhead support 61 may be a winch, a gantry, an overhead beam, a crane, or a ceiling attachment. The overhead support 61 may provide two or three-dimensional location of the suspended drill motor 12 including vertical adjustment of the length or height of the tether 60 to assist in positioning the drill motor 12 for operation. The clip 62 may be permanently engaged to the arcuate support guide 58 but normally employs a gate 63 pivotally movable to allow removable engagement of the clip 62 to the arcuate support guide 58. In a simplified implementation, the tether 60 may be looped through the slot 66 and secured to itself with the loop replacing the clip 62.

Figure 6:
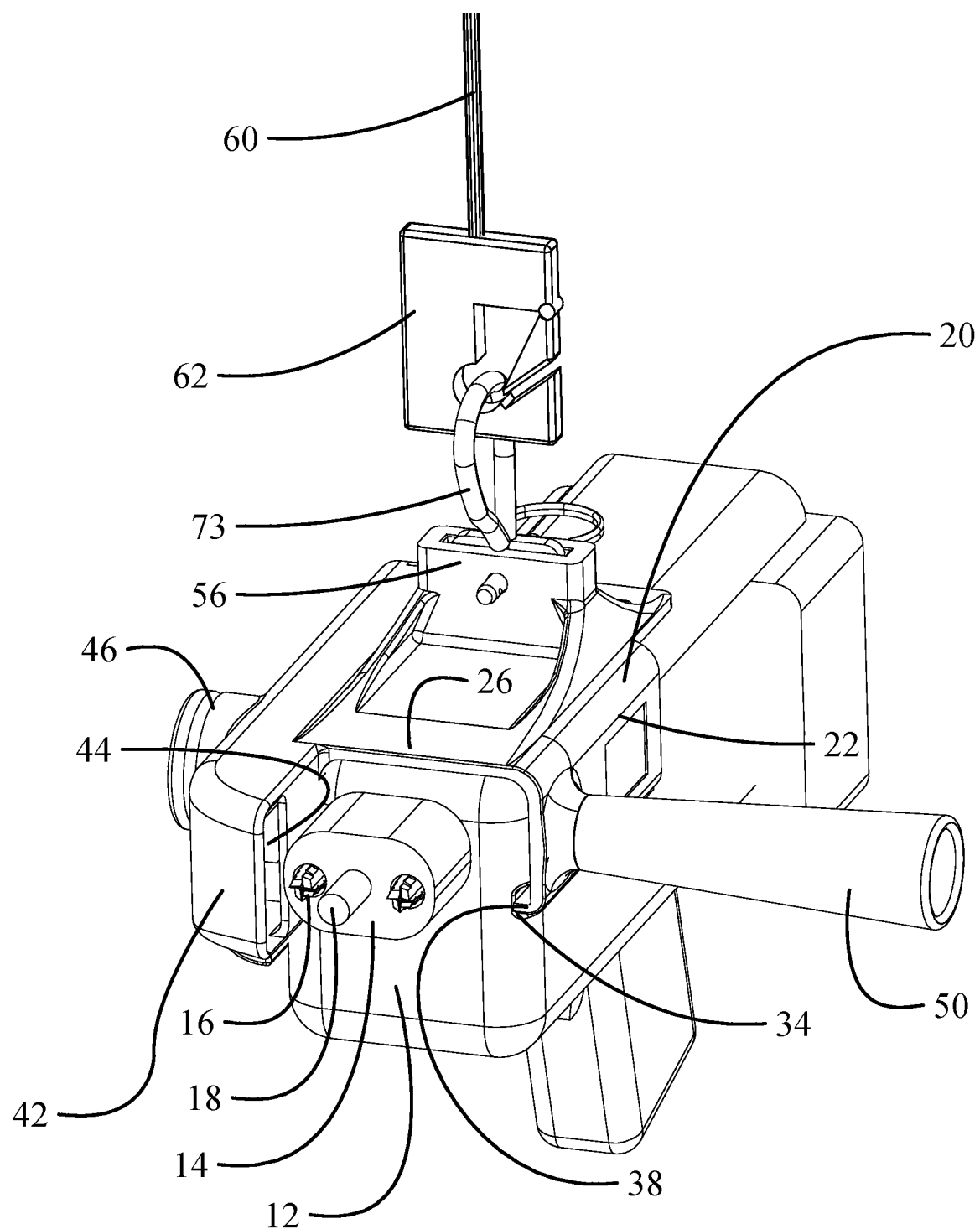
FIG. 6 is a front left pictorial representation of an alternative support implementation for the tool system.

For operations where there is minimal rotation of the drill motor 12 requiring balancing by the overhead support 61 and tether 60, but easy removal from the tether 60 is desired, a simple loop support 73 as seen in FIG. 6 may be employed to engage the clip 62. As seen in FIG. 2, the support attachment 56, a boss extending from the top plate 26 of the safety cover 20 in the exemplary implementation, allows removable attachment of the arcuate support guide 58 or loop support 73. Support attachment 56 incorporates a retention mechanism, which, for the exemplary implementation, is a channel 74 in the boss that receives a tang 76 on the arcuate support guide 58 (or tang 76' on the loop support 73). The tang 76, 76' is retained by a removable pin 78 extending through aligned bores 80 in the support attachment 56 and receiving bores 82 in the tangs 76, 76'. In alternative embodiments a depressible lip on the tangs received in a lateral groove or slot in the channel may be employed or the tangs may be T-shaped and received laterally in a T-shaped channel.

As also seen in FIG. 2, the supplemental grip 50 may be removably engaged to the boss 52 with a threaded rod 84 and mating threaded hole 86. In alternative embodiments the supplemental grip may have a foldable joint for attachment to the boss.

Figure 3A:
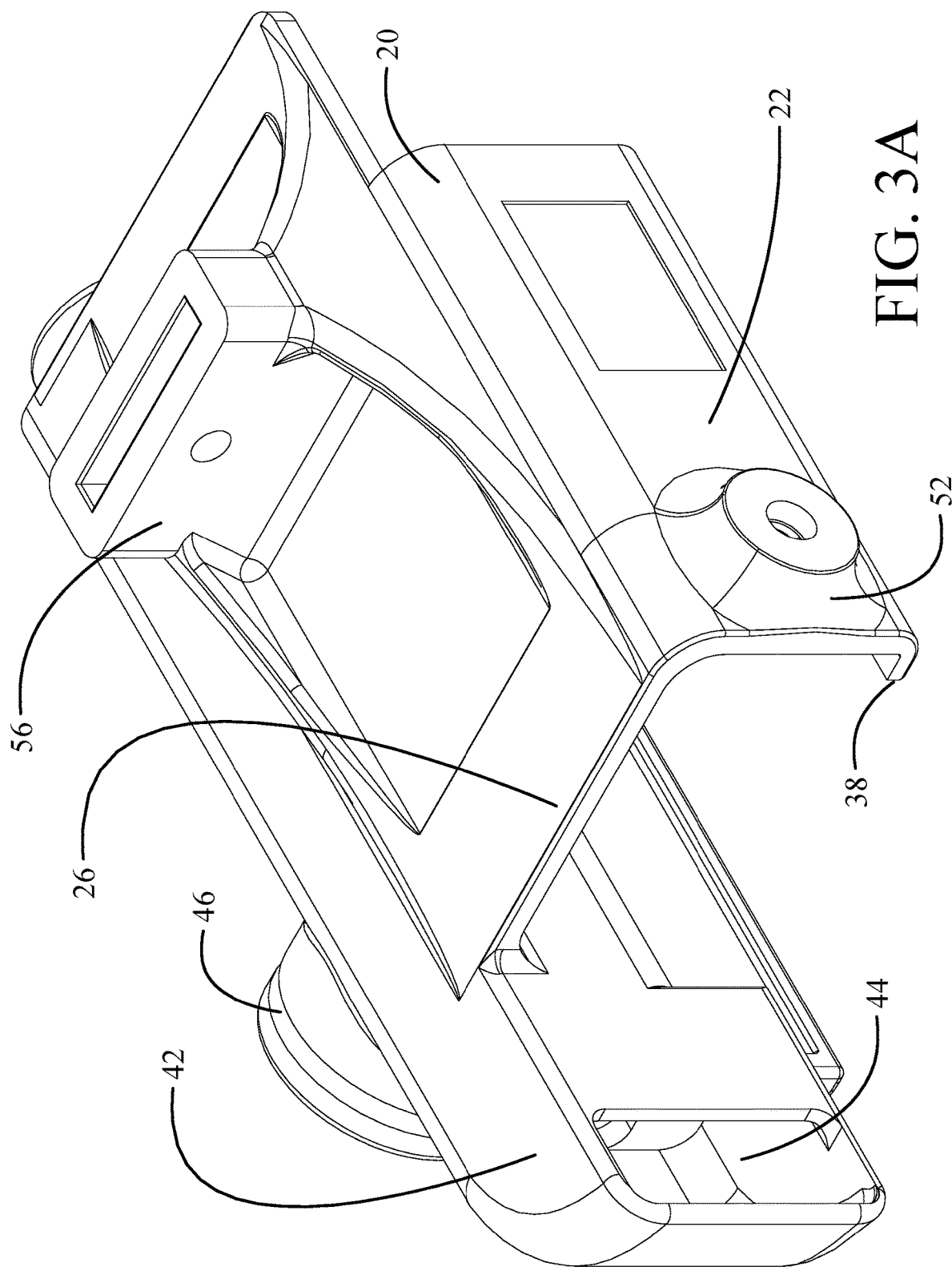
FIG. 3A-3C show a front left pictorial representation, left rear pictorial representation, and right rear pictorial representations, respectively, of the safety cover.
Figure 3B:
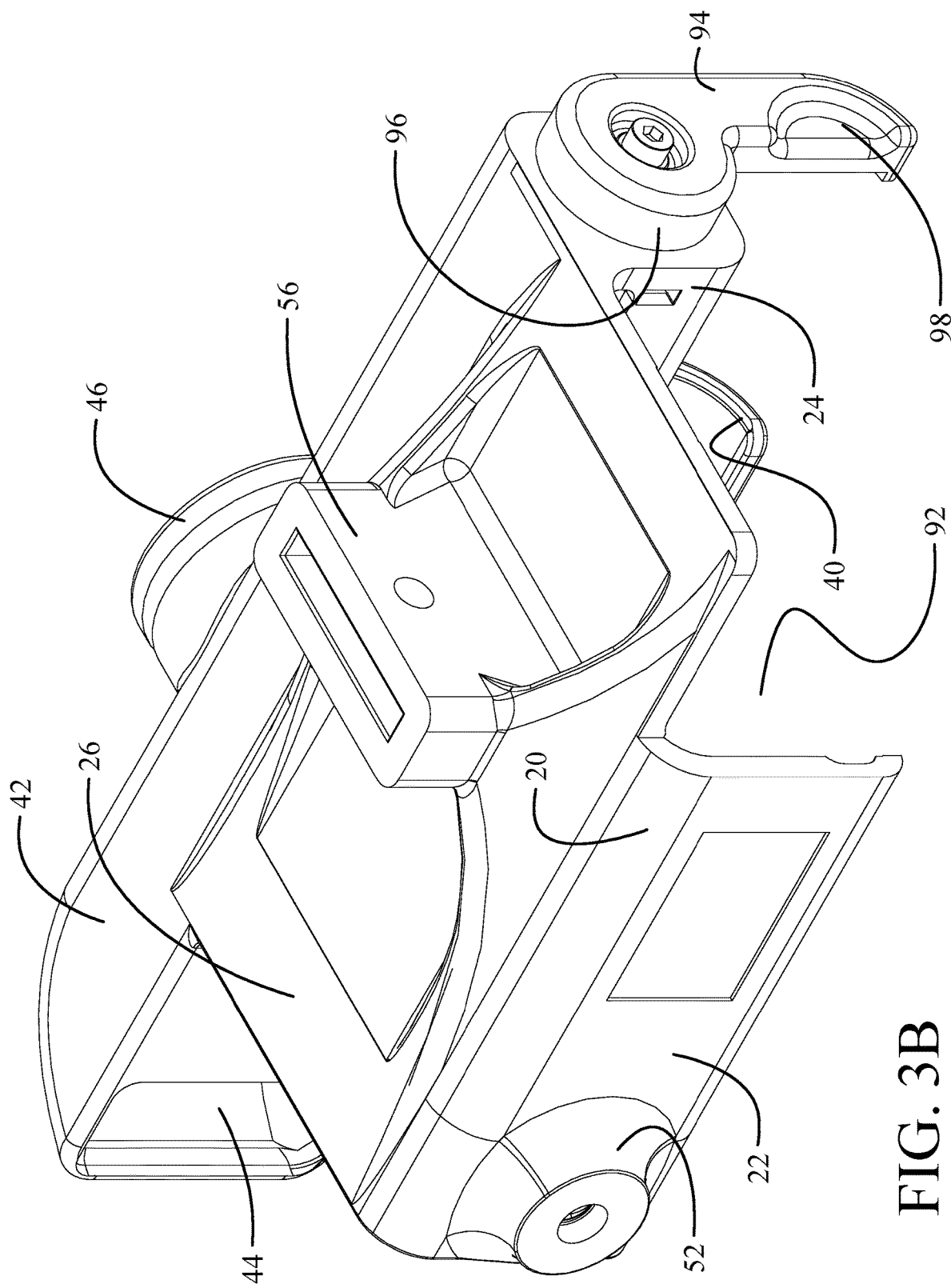
Figure 3C:
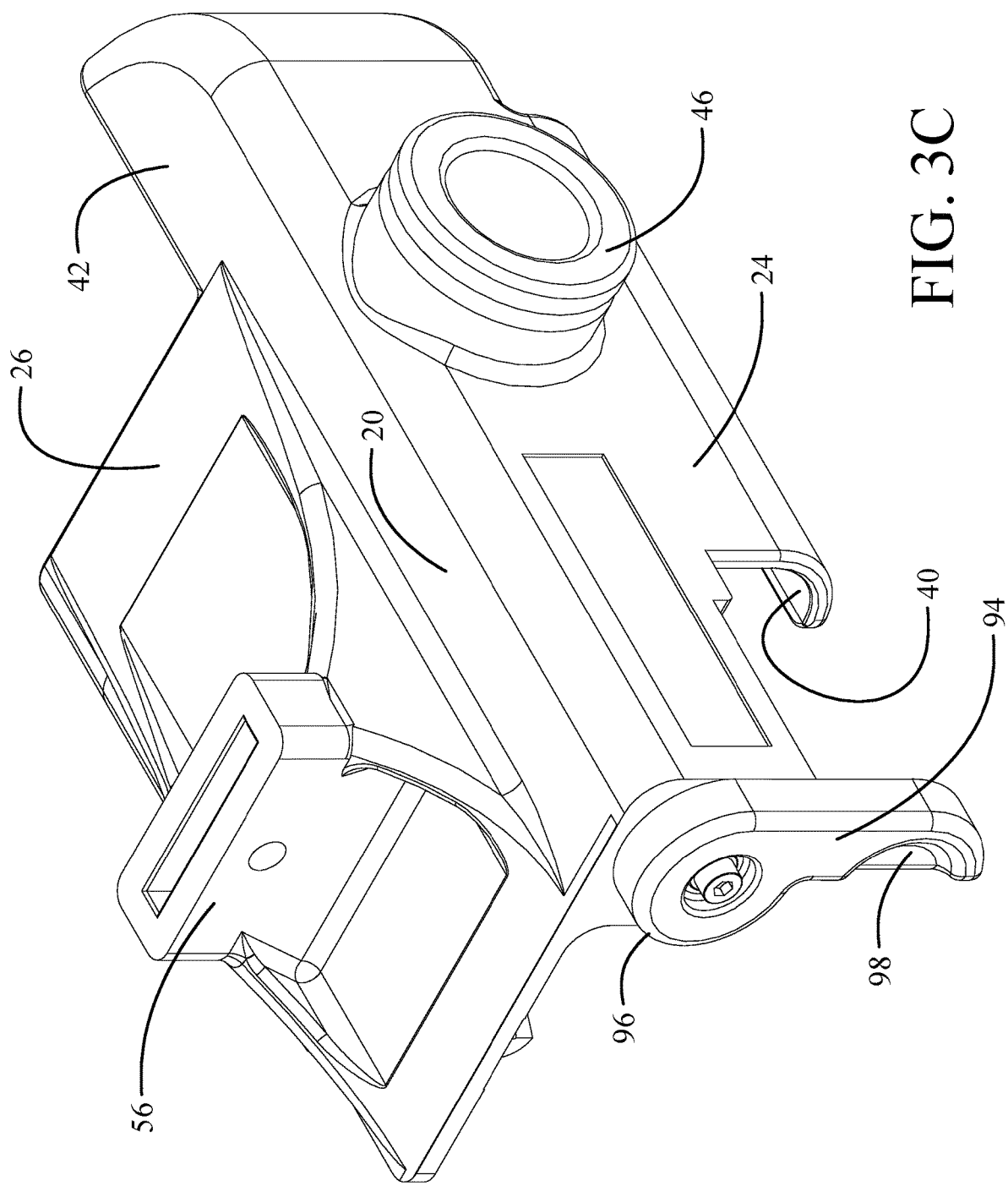
Figure 4:
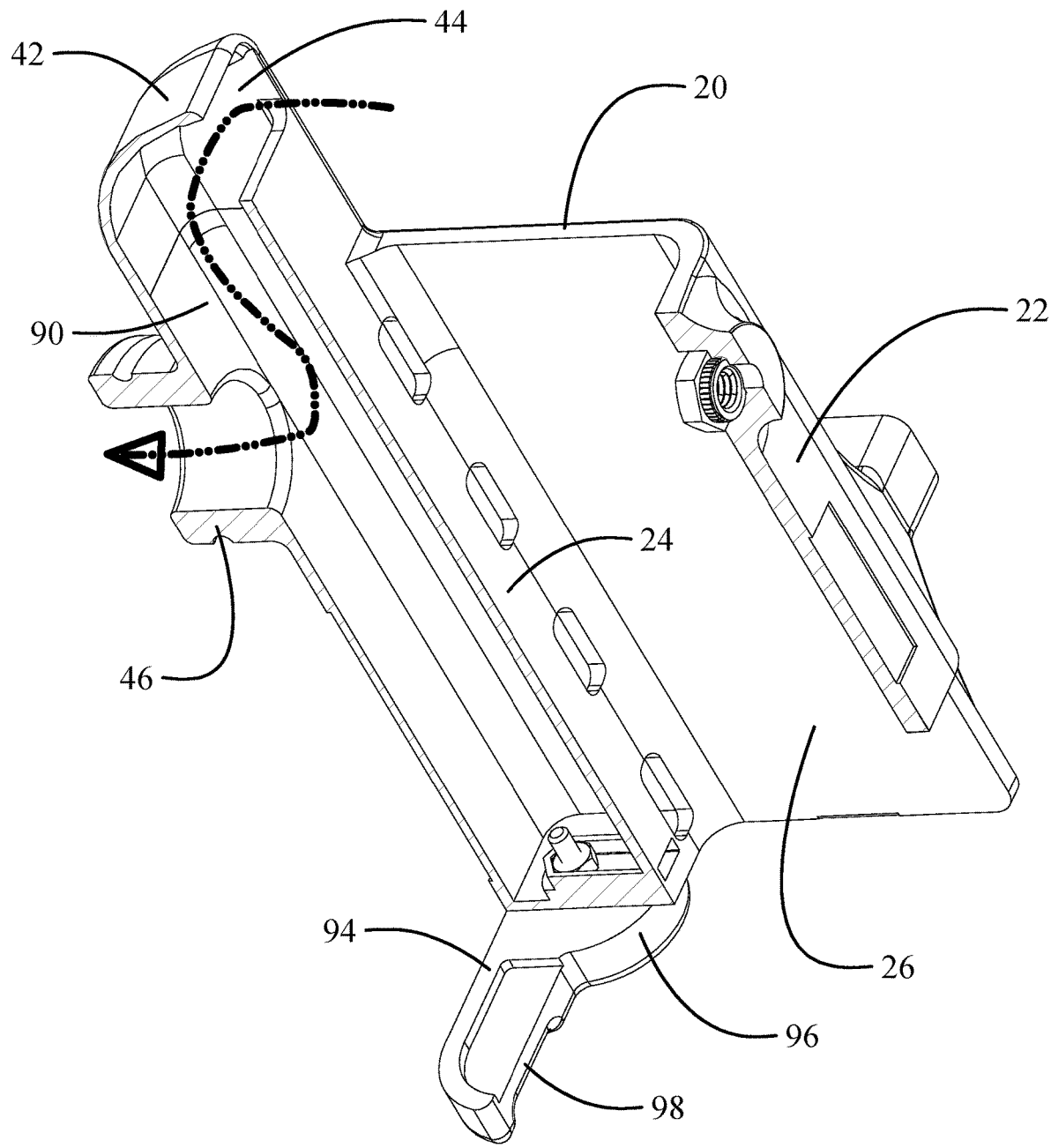
FIG. 4 is a sectioned bottom pictorial representation of the safety cover showing the vacuum extraction plenum.

As seen in FIGS. 1A and 1n detail in FIG. 3A and FIG. 4, the vacuum extractor 42 positions the inlet aperture 44 adjacent the drill foot 14. Vacuum applied to the vacuum port 46 draws chips and other debris from the exhaust stream created by operation of the drill bits 16 on a work piece, as well as any aerosols or vapor created by heating of the drilling operation on the fiber composite material, into a vacuum plenum 90 that interconnects the inlet aperture 44 and the vacuum port 46. The vacuum plenum 90 provides sufficient volume to create a stable flow through the vacuum extractor 42 into the vacuum hose 48 allowing extraction of at least a majority of the exhaust stream of the drilling operation from the work environment. While one vacuum port 46 is shown in the exemplary implementation, multiple sealable ports may be employed with various location and orientation from the vacuum plenum 90 to optimize attachment of the vacuum hose.

Figure 5:
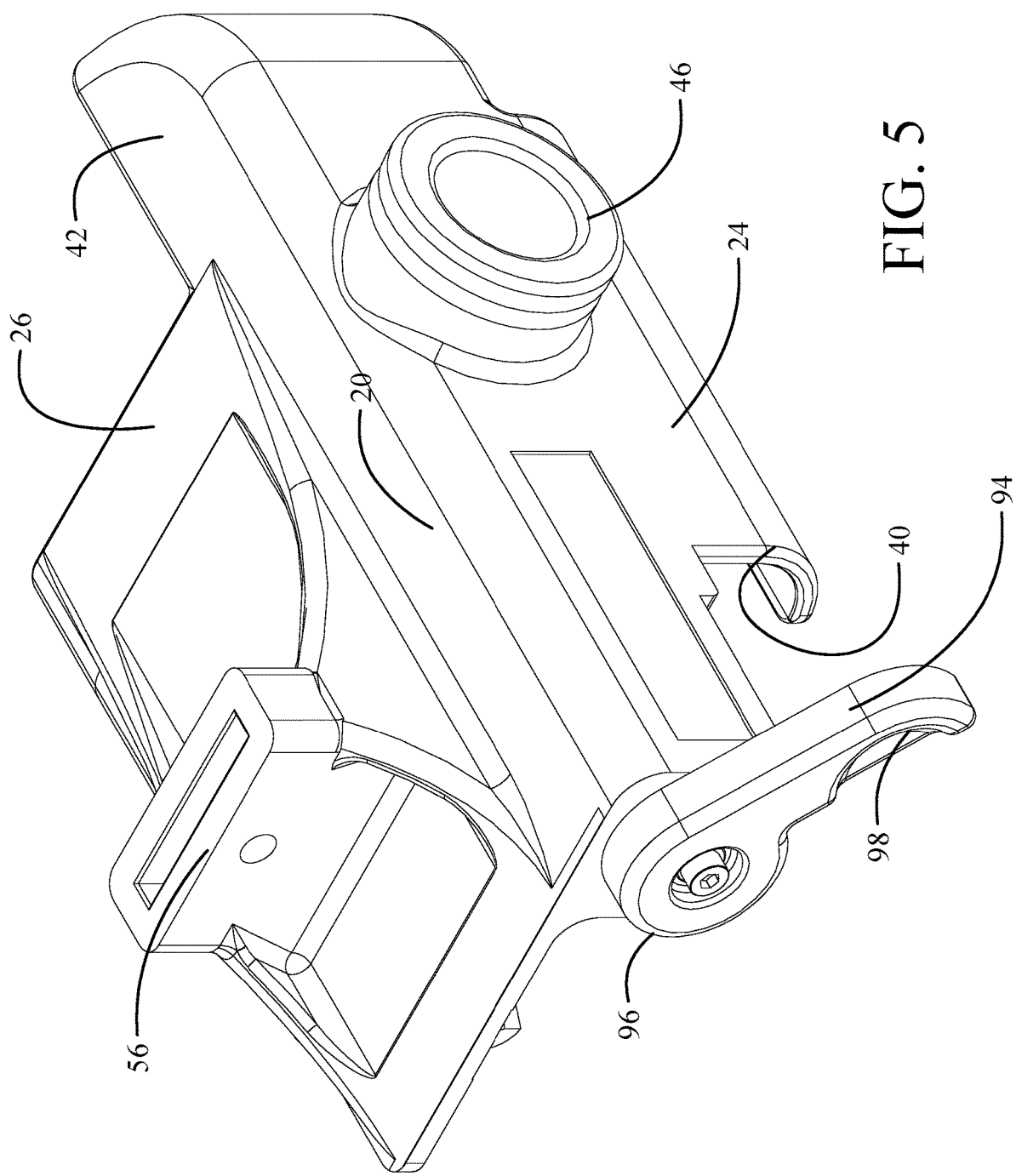
FIG. 5 is a right rear pictorial representation of the safety cover with the locking lever in the unlocked position.

As previously described, the safety cover 20 employs first and second flanges 22 and 24 to engage geometrical features on the drill motor 12. As seen in FIG. 3A, first flange 22 has extending lip 38 to engage slot 34 on the first side 30 of the drill motor. Saddle 40 on the second flange 24 (seen in FIGS. 3A, 3B and 3C) engages the semi-cylindrical protrusion 36 on the second side 32 of the drill motor. The first and second flanges 22, 24 depending from the top plate 26 form a receiving channel 92 into which the drill motor 12 is removably inserted. The geometric features, slot 34 and semi-cylindrical protrusion 36 on the first and second sides 30, 32 of the drill motor 12, are received and engaged by the lip 38 and saddle 40 on first and second flanges 22, 24, respectively. A locking lever 94, best seen in FIGS. 1F and 3C in the closed or locked position and the open position in FIG. 5, secures the drill motor 12 in the safety cover 20. The locking lever may be a cam arrangement engaging a locking circumference 96 against the second side 32 or may include a locking profile 98 received in the geometric feature such as a perpendicular slot 100 in the semi-cylindrical protrusion 36 or both. Various selected drill motors 12 may be easily inserted and removed from the safety cover and support assembly 19.

Figure 7:
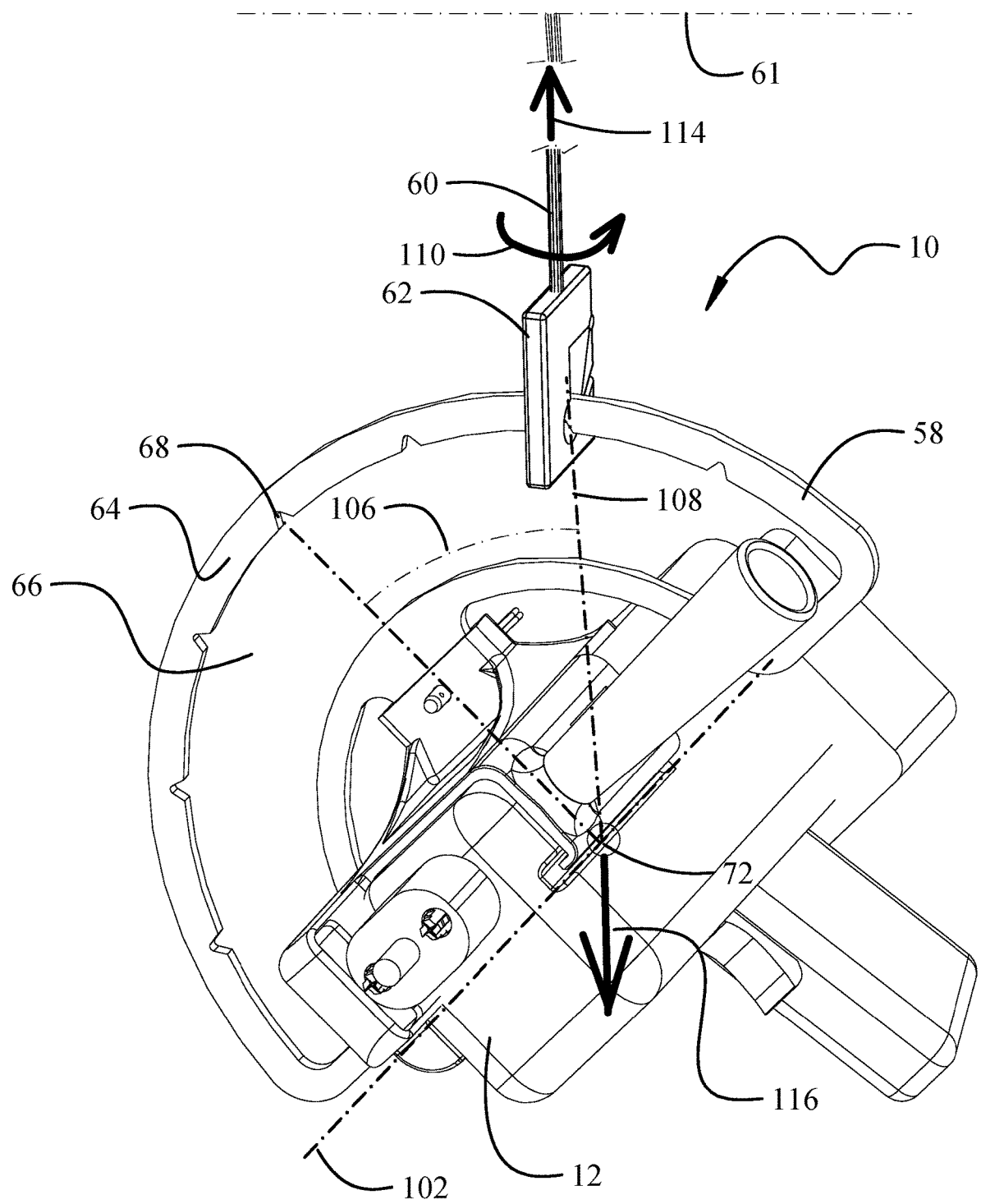
FIG. 7 shows a front view of the first exemplary implementation with the tool rotated in roll; and, FIGS. 8A and 8B are a flow chart showing a method for operation of a tool employing the disclosed implementations.

As previously described, the safety cover and support assembly 19 incorporates an arcuate support guide 58 that provides support extending through the center of gravity of the drill motor 12 to balance operational loads of the tool that would otherwise be borne by the operator. As seen in FIG. 7, rotation of the drill motor 12 by the operator, about a roll axis 102 (seen in FIG. 7) extending through the center of gravity 72 causes sliding of the clip 62 through the slot 55 to a desired angle 106 with respect to a vertical axis 108 extending through the center of gravity 72. Additionally, the drill motor 12 may be rotated in yaw (represented by arrow 110 in FIG. 7) about a yaw axis through the tether 60 coincident with a reaction force 114. This rotational capability created by the safety cover and support assembly 19 allows the operator to position the drill motor 12 at any desired angle for operation. The arcuate support guide 58, mounted through the support attachment 56 to the top plate 26 of the safety cover 20 is configured to maintain the reaction force 114 in alignment with the center of gravity 72 of the drill motor 12 as the drill motor 12 is rotated with respect to the center of gravity 72 thus aligning the gravitational force 116 on the drill motor 12 and reaction force 114 supplied by the overhead support and does not induce torque on the operator's hand wrist or arm to support the drill motor 12.

Figure 8B:
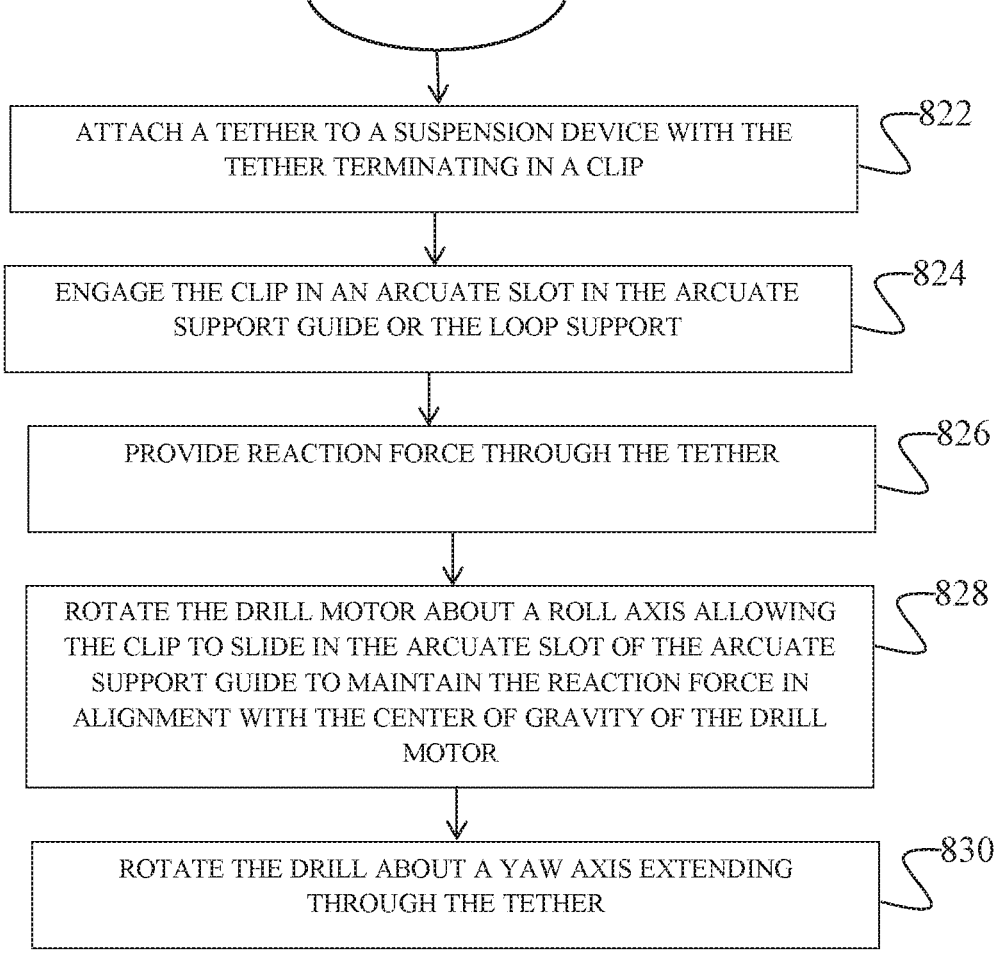

The implementations described provide a method 800 as shown in FIGS. 8A and 8B for operation of a tool system 10 for drilling. Geometrical elements of a drill motor are engaged in a safety cover 20 having a first flange 22 and a second flange 24 depending from a top plate 26, with the first flange 22 and second flange 24 shaped to receive the geometrical elements, step 802. This may be accomplished in an exemplary implementation by receiving an extending lip 38 on the first flange 22 within a slot 34, step 803, the slot comprising one of the geometrical elements on a first side of the drill motor and receiving a protrusion 36 in a saddle 40 on the second flange 24, step 804, the protrusion comprising a second of the geometrical elements on a second side of the drill motor. An inlet aperture of a vacuum extractor 42 extending from the second flange 24 is positioned adjacent a drill foot of the drill motor, step 806. A locking cam circumference of a locking lever 94 is rotated against the second side 32 of the drill motor, step 808, or a locking profile 98 of the locking lever is received in a perpendicular slot 100 in the semi-cylindrical protrusion, step 810.

A support is engaged in a support attachment 56 extending from the top plate 26, step 812. This may be accomplished in exemplary implementations by selecting one of an arcuate support guide or a loop support, step 814, and removably receiving the selected one of the arcuate guide and loop support with a retention mechanism in the support attachment, step 816. The retention mechanism in the exemplary implementation is a channel in the support attachment and each of the arcuate support guide and loop support further comprise a tang 76, and the tang is removably received in the channel, step 818, and a removable pin 78 is inserted extending through aligned bores 80 in the support attachment 56 and receiving bores 82 in the tangs, step 820. The arcuate support guide has a plate 64 having an arcuate slot 66 with an arc 69 with respect to an axis 70 through a center of gravity 72 of the drill motor. A tether is attached to a suspension device with the tether terminating in a clip, step 822. The clip is engaged in the arcuate slot, step 824, and a reaction force is provided through the suspension device, step 826.

The drill motor 12 is rotated about a roll axis 102 such that the clip 62 slides in the slot in the arcuate support guide 58 to maintain the reaction force 114 in alignment with the center of gravity 72 of the drill motor 12, step 828, and/or the drill motor 12 may be rotated about a yaw axis 112 extending through the tether, step 830.

Having now described various implementations in detail as required by the patent statutes, those skilled in the art will recognize modifications and substitutions to the specific implementations disclosed herein. Such modifications are within the scope and intent of the present invention as defined in the following claims.

What is claimed is:

1. A safety cover and support assembly to engage a support providing an upward reaction force applied by a suspension device, the safety cover and support assembly comprising:
   a safety cover having
      a first flange and a second flange depending from a top plate, the first flange and second flange configured to removably receive and engage a drill motor;
      a vacuum extractor extending from the second flange with an inlet aperture positioned adjacent a drill foot of the drill motor; and,
   a support attachment extending upwardly from the top plate and configured to engage the support thereby suspending the safety cover and the drill motor engaged therein wherein the support comprises an arcuate support guide providing the upward reaction force applied over a center of gravity of the drill motor, and wherein the support attachment is engaged to the arcuate support guide.

2. The safety cover and support assembly as defined in claim 1 wherein the drill motor is removably inserted into the safety cover with the top plate configured to engage a top surface of the drill motor and the first and second flanges engaging first and second sides of the drill motor.

3. The safety cover and support assembly as defined in claim 2 wherein an extending lip on the first flange is received within a slot on a first side of the drill motor and a saddle on the second flange receives a protrusion on a second side of the drill motor.

4. The safety cover and support assembly as defined in claim 3 further comprising a locking lever having one or both of a cam engaging a locking circumference against the first side of the drill motor or a locking profile received in a perpendicular slot in the protrusion.

5. The safety cover and support assembly as defined in claim 1 wherein the safety cover further comprises a supplemental grip removably received on a boss on the first flange.

6. The safety cover and support assembly as defined in claim 1 wherein the vacuum extractor further comprises a vacuum port extending transversely from the vacuum extractor and the vacuum extractor has a vacuum plenum between the inlet aperture and the vacuum port.

7. The safety cover and support assembly as defined in claim/wherein the arcuate support guide comprises a plate with an arcuate slot and a clip suspended from a tether is slidably engaged in the slot with the tether connected to the suspension device.

8. The safety cover and support assembly as defined in claim 7 wherein the arcuate slot has a 180° arc with respect to an axis through a center of gravity of the drill motor.

9. A safety cover and support assembly to engage a support providing an upward reaction force applied by a suspension device, the safety cover and support assembly comprising:
   a safety cover having
      a first flange and a second flange depending from a top plate, the first flange and second flange shaped to removably receive and engage first and second sides of a drill motor;
      a vacuum extractor extending from the second flange with an inlet aperture positioned adjacent a drill foot of the drill motor; and,
   a support attachment extending from the top plate;
      wherein the support is a selected one of an arcuate support guide or a loop support, each of said arcuate guide and loop support removably received with a retention mechanism in said support attachment and the retention mechanism comprises a channel in the support attachment and each of the arcuate guide and loop support further comprise a tang removably received in the channel with a removable pin extending through aligned bores in the support attachment and receiving bores in the tangs.

10. The safety cover and support assembly as defined in claim 9 wherein the drill motor is removably inserted into the safety cover with the top plate configured to engage a top surface of the drill motor and the first and second flanges engage first and second sides of the drill motor wherein an extending lip on the first flange is received within a slot on a first side of the drill motor and a saddle on the second flange receives a protrusion on a second side of the drill motor.

11. The safety cover and support assembly as defined in claim 9 wherein the safety cover further comprises a supplemental grip removably received on a boss on the first flange.

12. The safety cover and support assembly as defined in claim 9 wherein the vacuum extractor further comprises a vacuum port extending transversely from the vacuum extractor and the vacuum extractor has a vacuum plenum between the inlet aperture and the vacuum port.

13. A method for drilling comprising:
engaging a drill motor in the safety cover and support assembly of claim 6 having
the first flange and the second flange depending from the top plate, the first flange and second flange configured to removably receive and engage the drill motor;
the vacuum extractor extending from the second flange with the inlet aperture positioned adjacent a drill foot of the drill motor; and,
the support attachment extending upwardly from the top plate and configured to engage the support thereby suspending the safety cover and the drill motor engaged therein wherein the support comprise the arcuate support guide providing the upward reaction force applied over the center of gravity of the drill motor, and wherein the support attachment is engaged to the arcuate support guide; and,
positioning the inlet aperture of the vacuum extractor extending from the second flange adjacent the drill foot of the drill motor; and,
engaging the support in the support attachment thereby suspending the drill motor.

14. The method as defined in claim 13 wherein the arcuate support guide comprises a plate having an arcuate slot with an arc with respect to an axis through a center of gravity of the drill motor, and further comprising:
attaching a tether to a suspension device, said tether terminating in a clip;
engaging the clip in the arcuate slot; and,
providing a reaction force through the suspension device.

15. The method as defined in claim 14 wherein the step of engaging geometrical elements further comprises:
receiving an extending lip on the first flange within a slot, said slot comprising one of said geometrical elements on a first side of the drill motor; and
receiving a protrusion in a saddle on the second flange, said protrusion comprising a second of said geometrical elements on a second side of the drill motor.

16. The method as defined in claim 15 further comprising:
engaging a locking cam circumference of a locking lever against the second side of the drill motor; or,
receiving a locking profile in a perpendicular slot in the semi-cylindrical protrusion.

17. The method as defined in claim 13 wherein the step of engaging a support comprises:
selecting one of an arcuate support guide or a loop support;
removably receiving the selected one of said arcuate guide and loop support with a retention mechanism in said support attachment.

18. The method as defined in claim 17 wherein the retention mechanism comprises a channel in the support attachment and each of the arcuate guide and loop support further comprise a tang, said step of removably receiving the selected one comprising:
removably receiving the tang in the channel; and,
inserting a removable pin extending through aligned bores in the support attachment and receiving bores in the tangs.

19. The method as defined in claim 13 further comprising removably receiving a supplemental grip on a boss on the first flange.

20. The method as defined in claim 14 further comprising rotating the drill motor about a roll axis extending through the center of gravity sliding the clip through the slot to a desired angle with respect to a vertical axis extending through the center of gravity.

\* \* \* \* \*